(12) United States Patent
Donovan et al.

(10) Patent No.: US 9,915,202 B2
(45) Date of Patent: Mar. 13, 2018

(54) GAS TURBINE ENGINE HEAT EXCHANGER SYSTEM

(71) Applicant: Rolls-Royce North American Technologies, Inc., Indianapolis, IN (US)

(72) Inventors: Eric S. Donovan, Fishers, IN (US); Daniel J. Vonderwell, Thorntown, IN (US); Craig Heathco, Greenwood, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 725 days.

(21) Appl. No.: 14/104,299

(22) Filed: Dec. 12, 2013

(65) Prior Publication Data
US 2014/0356125 A1    Dec. 4, 2014

Related U.S. Application Data

(60) Provisional application No. 61/772,967, filed on Mar. 5, 2013.

(51) Int. Cl.
*F02C 7/05* (2006.01)
*F02C 7/052* (2006.01)
*F02C 7/12* (2006.01)

(52) U.S. Cl.
CPC ............... *F02C 7/05* (2013.01); *F02C 7/052* (2013.01); *F02C 7/12* (2013.01); *F05D 2260/205* (2013.01); *F05D 2260/213* (2013.01); *Y02T 50/675* (2013.01)

(58) Field of Classification Search
CPC .... F02C 7/05; F02C 7/052; F02C 7/12; F02C 7/185; F05D 2260/205; F05D 2260/213
See application file for complete search history.

(56) References Cited

U.S. PATENT DOCUMENTS

| 4,002,024 A | 1/1977 | Nye et al. |
| 4,203,566 A | 5/1980 | Lord |
| 4,212,595 A | 7/1980 | Kuintzle, Jr. et al. |
| 4,291,530 A | 9/1981 | Ballard |
| 4,418,527 A | 12/1983 | Schlom et al. |
| 5,284,012 A | 2/1994 | Laborie et al. |

(Continued)

FOREIGN PATENT DOCUMENTS

| JP | H0833418 A | 2/1996 |
| WO | WO-2012088543 A1 | 6/2012 |

OTHER PUBLICATIONS

Int'l Search Report for PCTUS2013070294 dated Mar. 25, 2014.

*Primary Examiner* — Justin Seabe
*Assistant Examiner* — Juan G Flores
(74) *Attorney, Agent, or Firm* — Fishman Stewart PLLC

(57) ABSTRACT

An apparatus includes a gas turbine engine and a heat transfer system. The gas turbine engine includes an inlet particle separator that separates inlet air into scavenge air and clean air. A scavenge air path conveys the scavenge air from the inlet particle separator to the heat transfer system. A heat exchange fluid path conveys a heat exchange fluid to the heat transfer system and a cooled heat exchange fluid away from the heat transfer system. The heat transfer system is configured to transfer heat from the heat exchange fluid path to the scavenge air path to cool the heat exchange fluid.

16 Claims, 1 Drawing Sheet

(56) References Cited

U.S. PATENT DOCUMENTS

| | | |
|---|---|---|
| 6,651,929 B2 | 11/2003 | Dionne |
| 7,284,953 B2 | 10/2007 | Silverman et al. |
| 7,475,549 B2 | 1/2009 | Alexander et al. |
| 7,857,257 B2 | 12/2010 | Schwarz |
| 7,926,261 B2 * | 4/2011 | Porte ..................... B64D 13/06 60/226.1 |
| 2006/0076120 A1 | 4/2006 | Bollweg |
| 2008/0230651 A1 | 9/2008 | Porte |
| 2009/0056125 A1 | 3/2009 | Howe et al. |
| 2012/0159961 A1 * | 6/2012 | Krautheim .............. F02C 7/052 60/782 |
| 2014/0119891 A1 * | 5/2014 | Schmittenberg ....... B64D 33/02 415/121.2 |
| 2014/0119903 A1 * | 5/2014 | Suciu ..................... F02C 7/052 415/177 |

* cited by examiner

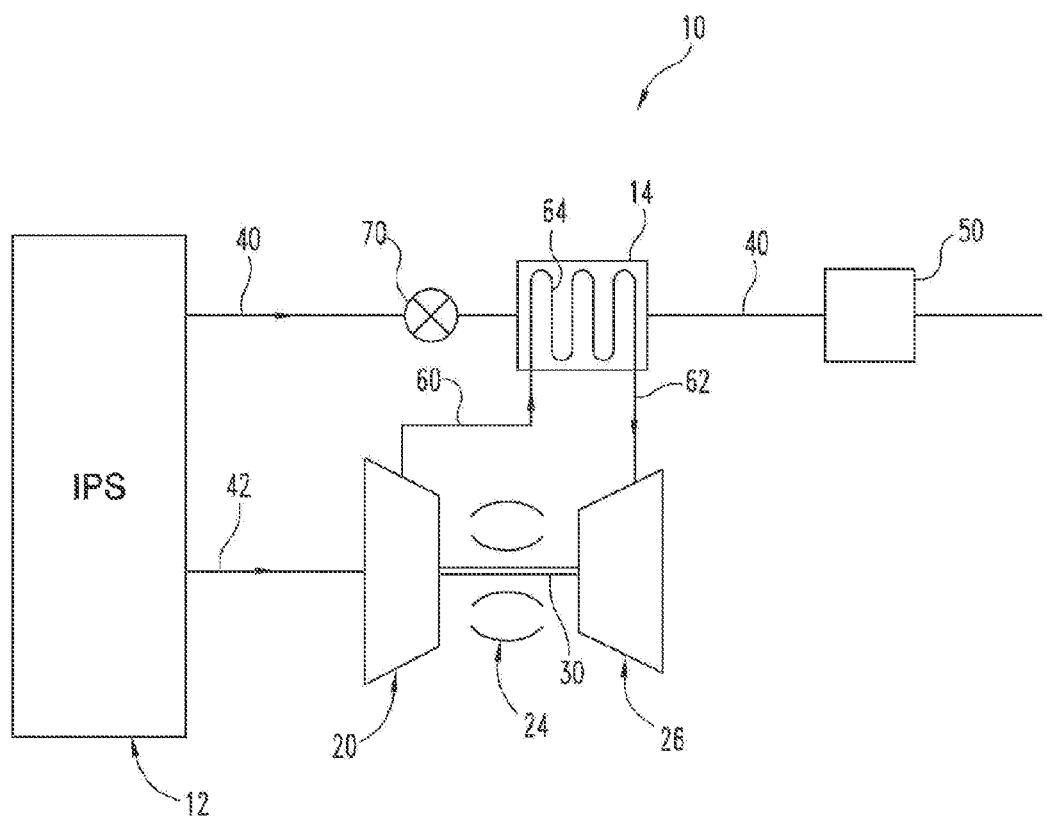

GAS TURBINE ENGINE HEAT EXCHANGER SYSTEM

CROSS-REFERENCE TO RELATED APPLICATIONS

This application claims priority to U.S. Provisional Patent Application No. 61/772,967 filed Mar. 5, 2013, the contents of which is hereby incorporated in its entirety.

TECHNICAL FIELD

The present application relates to gas turbine engines, and more particularly, but not exclusively, to gas turbine engine heat exchanger systems.

BACKGROUND

Gas turbine engine heat exchanger systems such as cooled cooling air systems, remain an area of interest. Some existing systems and methods have various shortcomings, drawbacks, and disadvantages relative to certain applications. Accordingly, there remains a need for further contributions in this area of technology.

SUMMARY

One embodiment of the present disclosure is a unique gas turbine engine and heat exchanger system that uses scavenge air for cooling. Other embodiments include apparatuses, systems, devices, hardware, methods, and combinations for drawing scavenge air from an engine inlet particle separator of a gas turbine engine and exchanging heat between the scavenge air stream and a fluid stream of another component of the gas turbine engine, or a component auxiliary to or external to the gas turbine engine. Further embodiments, forms, features, aspects, benefits, and advantages of the present application shall become apparent from the description and FIGURE provided herewith.

BRIEF DESCRIPTION OF THE DRAWINGS

Features of the application will be better understood from the following detailed description when considered in reference to the accompanying drawings, in which:

The FIGURE is a block diagram of a gas turbine engine including an engine inlet particle separator and a heat exchanger system according to an embodiment.

DETAILED DESCRIPTION

While the present disclosure can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications of the described embodiments, and any further applications of the principles of the disclosure as described herein, are contemplated as would normally occur to one skilled in the art to which the disclosure relates.

The FIGURE is a block diagram of a gas turbine engine 10 including an engine inlet particle separator 12 and a heat exchanger system 14 according to an embodiment. As will be described in greater detail below, the heat exchanger system 14 uses scavenge air provided by the engine inlet particle separator 12 to cool one or more components of, or one or components auxiliary to or external to, the gas turbine engine 10.

The gas turbine engine 10 can comprise any type of gas turbine engine, for example, a turboshaft engine, a turboprop engine, or the like. The gas turbine engine 10 includes axially in the forward to aft direction the engine inlet particle separator 12 and an engine core including a compressor section 20, a combustor section 24, and a turbine section 26. The compressor section 20 can comprise any number of compressors, including for example a low pressure compressor and a high pressure compressor. Likewise, the turbine section 26 can comprise any number of turbines, including for example a low pressure turbine and a high pressure turbine. Clean air from the engine inlet particle separator 12 is compressed by the compressor section 20 before entering the combustor section 24 where it is mixed with fuel and burned before being expanded by the turbine section 26. A rotating shaft 30 connects the turbine section 26 to the compressor section 20 and serves to transfer power between the two. The rotating shaft 30 can be coupled to one or more other devices, such as a driveshaft, transmission, and/or clutch, to provide rotational power to a driven component of an aircraft, surface vehicle, marine vehicle, or other system requiring gas turbine engine power generation. In one form, for example, the driven component comprises the rotor blades of a helicopter.

Airflow enters the gas turbine engine 10 through the engine inlet particle separator 12. The engine inlet particle separator 12 separates the inlet air into scavenge air and clean air. The scavenge air is routed through a scavenge air channel 40 to the heat exchanger system 14. The clean air is routed through a clean air channel 42 to the gas turbine engine 10 for use by the core components of the gas turbine engine 10. As used herein, the term "scavenge air" refers to air that contains particulate matter or foreign debris, such as sand, dust, or ice, and the term "clean air" refers to air that contains relatively less, or substantially no, particulate matter or foreign debris. The separation of the inlet air can be accomplished in any suitable manner depending on for example the application of the gas turbine engine 10 and environmental conditions. In one form, as the inlet air passes through the engine inlet particle separator 12, the momentum and/or inertia of the particulate matter and/or foreign debris in the inlet air urges a substantial portion or all of the particulate matter and/or foreign debris to the scavenge air channel 40, thus creating a scavenge air stream. The remaining portion of the inlet air, including any unscavenged particles and/or debris, forms the clean air stream that is routed to the core of the gas turbine engine 10 via the clean air channel 42. As will be appreciated, the engine inlet particle separator 12, as well as the scavenge air channel 40 and the clean air channel 42, can comprise any configuration, shape, size, and/or orientation, depending on for example the particular particle separation requirements of the gas turbine engine 10 and the location and configuration of other components of the gas turbine engine 10. The engine inlet particle separator 12, the scavenge air channel 40, and/or the clean air channel 42, can comprise one or more flow paths, valves, splitters, diffusers, and/or pumps, for example, to separate the inlet air and distribute the scavenge air to the heat exchanger system 14 and/or the clean air to the core of the gas turbine engine 10.

In the embodiment shown in the FIGURE, a blower 50 draws the scavenge air through the scavenge air channel 40 and to the heat exchanger 14, and then exhausts the scavenge air as exhaust air to the downstream end of the blower 50, for example, overboard of the gas turbine engine 10. The blower 50 can comprise any suitable air conveying device to convey the scavenge air, including the particulate matter and/or foreign debris, to the heat exchanger 14 and the downstream end of the blower 50. For example, the blower 50 can comprise one or more of an axial or centrifugal fan, and/or pump, and/or compressor, and can be driven by any suitable means, for example, mechanically, electrically, pneumatically, and/or hydraulically. In one form, the blower 50 can be mechanically driven via a power take-off system in which for example the blower 50 takes power via a suitable gear assembly at a location along the rotating shaft 30 in the combustor section 20 of the gas turbine engine 10, where the power take-off system may be positioned transverse to the rotating shaft 32, for example. In one form, the blower 50 can additionally draw air from a separate source different from the scavenge air channel 40, for example from a fluid flow passage external to the gas turbine engine 10, and provide a motive flow that draws on the scavenge air channel 40 and entrains the scavenge air. In another form, the blower 50 can draw the scavenge air at various flow rates, pressures, and/or temperatures depending on for example the operating conditions of the gas turbine engine 10. For example, in the case of a gas turbine engine 10 of a helicopter operating at low altitudes over a desert, the blower 50 can provide a more robust flow rate of the scavenge air. In one form, the blower 50 can be selectively operated to draw scavenge air at different flow rates depending on the changing operating conditions of the gas turbine engine 10. Thus, for example, the blower 50 can increase draw for example in the case of high concentrations of particulate matter at lower altitudes, and decrease draw for example in the absence of particulate matter at higher altitudes.

The heat exchanger system 14 exchanges heat between the scavenge air stream and a stream of heat exchange fluid used to cool one or more components of, or components auxiliary to, the gas turbine engine 10, and/or one or more components external to the gas turbine engine 10. In the illustrated embodiment, the heat exchange fluid comprises a cooling air stream that is routed from the compressor section 20 to the heat exchanger system 14 via a fluid flow path 60, and from the heat exchanger system 14 to the turbine section 24 via a fluid flow path 62. As the cooling air stream passes through the heat exchanger system 14, heat is transferred from the cooling air stream to the scavenge air stream, thus cooling the cooling air stream. The cooled cooling air stream is then routed to the turbine section 24 via the fluid flow path 62, where it can be used to remove heat produced by, for example, the impeller blades of the turbine section 24 during operation of the gas turbine engine 10.

The fluid flow paths 60, 62 are not limited to the configuration shown in the FIGURE, and other embodiments are contemplated. The fluid flow paths 60, 62 can comprise any configuration, shape, size, and/or orientation, depending on for example the application of the gas turbine engine 10 and its operating conditions. Thus, the fluid flow path 60 can be configured to route heat exchange fluid from any suitable source, whether a component of, or a component auxiliary to, the gas turbine engine 10, or a component external to the gas turbine engine 10. Similarly, the fluid flow path 62 can be configured to route cooled heat exchange fluid to any suitable object or component for which it may be necessary or desirable to cool with the cooled heat exchange fluid, such as a component of, auxiliary to, or external to, the gas turbine engine 10. The object of cooling can be one or more of mechanical components and/or systems, electrical and/or electronic circuits and/or systems, hydraulic fluid and/or related systems/components, and/or other components and/or systems, such as refrigeration components and/or systems. In one form, the cooled cooling air can be routed to the aft compressor stage, either axial or centrifugal, of a high pressure ratio compressor. In another form, the cooled cooling air can be routed to an engine or aircraft system, for example to an engine oil system or an embedded electrical system.

The fluid flow paths 60, 62 can comprise one or more fluid flow paths, valves, splitters, diffusers, and/or pumps, for example, to route the heat exchange fluid to and from the heat exchanger system 14 and to and from the object of cooling, for example, the core of the gas turbine engine 10. The fluid flow paths 60, 62 of the illustrated embodiment have an open configuration in which cooling air that is routed through the fluid flow passages 60, 62 originates as airflow from the atmosphere at the forward end of the gas turbine engine 10, and is exhausted as exhaust air to the atmosphere at the aft end of the gas turbine engine 10. In an alternative and/or additional embodiment, fluid flow paths that route heat exchange fluid to and away from the heat exchanger system 14 and to and away from the component to be cooled can be in fluid communication with each other to form a closed loop configuration.

The heat exchanger system 14 can comprise any material, type, size, quantity and/or orientation of heat exchangers. In the illustrative embodiment, the heat exchanger system 14 uses a cross flow system including a serpentine flow path 64 that fluidly connects the downstream end of the fluid flow path 60 to the upstream end of the fluid flow path 62, and a shell or chamber that fluidly connects an upstream portion of the scavenge air channel 40 to a downstream portion of the scavenge air channel 40. The chamber conveys the scavenge air stream from the upstream portion of the scavenge air channel 40, across the serpentine flow path 64, and to the downstream portion of the scavenge air channel 40. The heat exchanger system 14 can additionally and/or alternatively comprise a parallel flow system or a counter flow system, or a combination of such systems. The size of the heat exchanger system 14 is based on the application of the gas turbine engine 10, particularly the environmental conditions under which the engine is to operate, as well as on the type of heat exchange fluid routed through the heat exchanger system 14. In one form, the heat exchanger system 14 can operate over a wide range of pressures and temperatures. In one form, the heat exchanger system 14 can comprise a plurality of heat exchangers that correspond to respective scavenge air channels 40 disposed at respective different locations, for example circumferentially spaced locations, of the gas turbine engine 10.

The gas turbine engine 10 further includes a flow control mechanism 70 to adjust the scavenge air stream to modulate the temperature of the heat exchange fluid routed to the object of cooling, such as the turbine section 26 in the illustrative embodiment. The flow control mechanism 70 can be provided in the scavenge air channel 40 to control flow of the scavenge air through the scavenge air channel 40 and/or to the heat exchanger system 14. In one form, the flow control mechanism 70 can include for example one or more variable speed pumps and/or variable displacement pumps and/or control valves. The flow control mechanism 70 can be disposed in the scavenge air channel 40 between the inlet particle separator 12 and the heat exchanger system 14, as shown, or elsewhere, for example between the heat exchanger system 14 and the blower 50. In one form, the flow control mechanism 70 can comprise a component, or components, of the heat exchanger system 14 and/or the blower 50. In an additional and/or alternative embodiment, the flow control mechanism 70 can be disposed in one or both of the fluid flow paths 60, 62.

During operation of the gas turbine engine 10, the inlet particle separator 12 separates airflow that enters the gas turbine engine 10 into scavenge air and clean air. The clean air is routed to the core of the gas turbine engine 10, which compresses, combusts, and expands the air to produce thrust, and in the process generates heat in the turbine section 26. The scavenge air is routed to the scavenge air channel 40. The blower 50 draws the scavenge air from the scavenge air channel 40 and to the heat exchanger system 14. The fluid flow path 60 routes cooling air from the compressor section 20 of the gas turbine engine 10 to the heat exchanger system 14. The heat exchanger system 14 cools the cooling air by transferring heat from the cooling air stream to the scavenge air stream. The fluid flow path 62 routes the cooled cooling air from the heat exchanger system 14 to the turbine section 26, thus cooling the turbine section 26. The flow control mechanism 70 adjusts the scavenge air flow that is routed through the scavenge air channel 40 and bound for the turbine section 26 to modulate the temperature of the cooled cooling air.

Any theory, mechanism of operation, proof, or finding stated herein is meant to further enhance understanding of embodiment of the present disclosure and is not intended to make the present disclosure in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the disclosure have been illustrated and described in detail in the drawings and foregoing description, the same is to be considered as illustrative and not restrictive in character, it being understood that only the selected embodiments have been shown and described and that all changes, modifications and equivalents that come within the spirit of the disclosure as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow.

What is claimed is:

1. An apparatus comprising:
   a gas turbine engine including an inlet particle separator that separates inlet air into scavenge air and clean air, the clean air passing into the gas turbine engine;
   a heat transfer system;
   a scavenge air path that conveys all the scavenge air from the inlet particle separator to the heat transfer system;
   a heat exchange fluid path that conveys a heat exchange fluid to the heat transfer system and away from the heat transfer system, wherein the heat transfer system transfers heat from the heat exchange fluid path to the scavenge air path to cool the heat exchange fluid;
   a flow control mechanism positioned between the heat transfer system and the inlet particle separator such that all of the scavenge air passes through the flow control mechanism; and
   a blower positioned downstream from the heat transfer system such that the scavenge air that passes through the heat transfer system also passes through the blower;
   wherein the flow control mechanism controls a flow of the scavenge air to modulate a temperature of the heat exchange fluid; and
   wherein the flow control mechanism is a pump.

2. The apparatus of claim 1, further comprising a source component from which the heat exchange fluid path conveys the heat exchange fluid to the heat transfer system, in which the source component comprises a turbomachinery component of the gas turbine engine.

3. The apparatus of claim 1, further comprising a component to be cooled to which the heat exchange fluid path conveys the cooled heat exchange fluid from the heat transfer system.

4. The apparatus of claim 3, in which the component to be cooled further comprises a turbomachinery component of the gas turbine engine.

5. The apparatus of claim 1, wherein the blower draws the scavenge air through the flow control mechanism to the heat transfer system.

6. The apparatus of claim 1, wherein the blower draws the scavenge air at a rate that is dependent on operating conditions of the gas turbine engine.

7. An apparatus comprising:
   a gas turbine engine having a compressor and a turbine, the gas turbine engine including an engine inlet particle separator that separates inlet air into debris air and clean air, the clean air passing through the gas turbine engine;
   a debris air path that conveys the debris air;
   a cooling air path that conveys a cooling air;
   a thermal transfer system that transfers heat from the cooling air path to the debris air path to cool the cooling air, wherein the cooling air path passes from the compressor to the thermal transfer system and then to the turbine;
   a flow control mechanism passing all of the debris air therethrough to the thermal transfer system; and
   a blower positioned downstream from the thermal transfer system such that all the debris air that passes through the thermal transfer system also passes through the blower;
   wherein the flow control mechanism controls an amount of flow of scavenge air to modulate a temperature of the cooling air; and
   wherein the flow control mechanism is a pump.

8. The apparatus of claim 7, in which the debris air path extends from the thermal transfer system to the blower.

9. The apparatus of claim 7, in which the cooling air path is configured to convey the cooling air from a first component of the gas turbine engine to the thermal transfer system and from the thermal transfer system to a second component of the gas turbine engine to cool the second component.

10. The apparatus of claim 9, in which the first component is the compressor and the second component is the turbine.

11. The apparatus of claim 7, in which the blower is a pump that draws the debris air through the debris air path and to the thermal transfer system.

12. The apparatus as claimed in claim 7, in which the blower is a fan for drawing the debris air from the inlet particle separator to the thermal transfer system.

13. The apparatus of claim 7, wherein the blower draws the debris air at a rate that is dependent on operating conditions of the gas turbine engine.

14. A method of operating a gas turbine engine comprising:
- using an inlet particle separator of the gas turbine engine to separate inlet air into scavenge air and clean air;
- conveying all the scavenge air through a scavenge air channel from the inlet particle separator to a heat transfer system;
- conveying a cooling air through a cooling air channel that passes from the gas turbine engine to the heat transfer system;
- transferring heat, in the heat transfer system, from the cooling air channel to the scavenge air channel to cool the cooling air and then conveying the cooling air away from the heat transfer system to the gas turbine engine;
- drawing all the scavenge air that passes through the heat transfer system using a blower that is positioned downstream of the heat transfer system;
- modulating a temperature of the cooling air by controlling a rate of flow of the scavenge air with a flow control mechanism; and
- drawing the scavenge air, using the blower, at a rate that is dependent on operating conditions of the gas turbine engine.

15. The method of claim 14, in which the flow control mechanism is a pump.

16. The method of claim 14, in which the flow control mechanism is a valve.

* * * * *